United States Patent [19]

Alden

[11] 4,119,975

[45] Oct. 10, 1978

[54] FACSIMILE CASSETTE WITH WIRE ELECTRODE

[75] Inventor: John M. Alden, Needham, Mass.

[73] Assignee: Alden Research Foundation, Westboro, Mass.

[21] Appl. No.: 779,763

[22] Filed: Mar. 21, 1977

[51] Int. Cl.² ............................................ G01D 15/28
[52] U.S. Cl. ................................ 346/145; 346/139 C; 346/165
[58] Field of Search ............ 346/136, 145, 165, 139 C

[56] References Cited

U.S. PATENT DOCUMENTS

| | | | |
|---|---|---|---|
| 3,545,004 | 12/1970 | Alden | 346/145 X |
| 3,890,622 | 6/1975 | Alden | 346/145 X |

*Primary Examiner*—George H. Miller, Jr.
*Attorney, Agent, or Firm*—Grover and Meegan

[57] ABSTRACT

In a cassette for a facsimile recorder with a moving electrode which scans across a recording web and marks the web with graphic signals electrically applied between the moving electrode and a cooperating linear electrode, the cassette has a tubular housing and a lip extending from the housing. The linear electrode is polygonally cylindrical in cross section and is attached to the underside of the cassette lip.

9 Claims, 5 Drawing Figures

U.S. Patent  Oct. 10, 1978  4,119,975
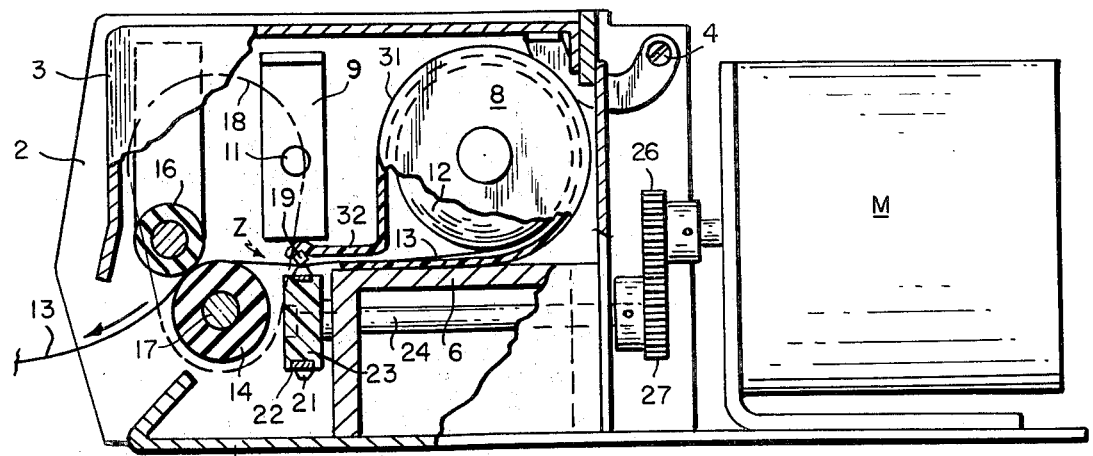
FIG. 1
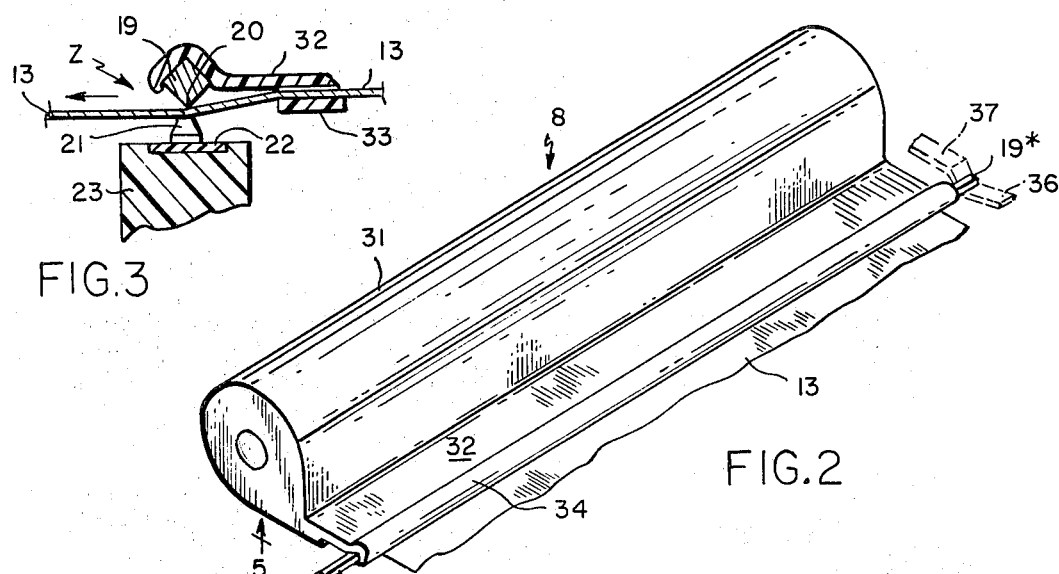
FIG. 3
FIG. 2
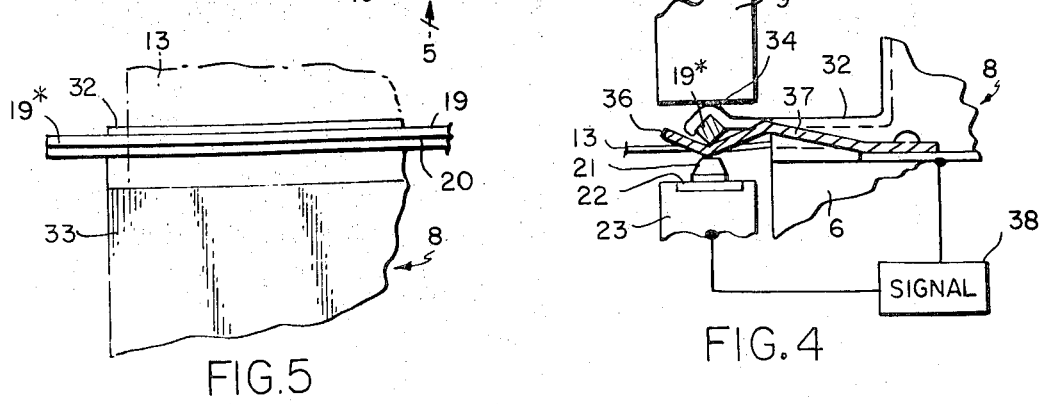
FIG. 5
FIG. 4

FACSIMILE CASSETTE WITH WIRE ELECTRODE

BACKGROUND OF THE INVENTION

In cassertte facsimile recorders of the type shown in the application of George C. Williams, Ser. No. 755,211, filed Dec. 29, 1976 and entitled Electrical Recorder and Belt with Styli Therefor, a web of moist electrolytic recording paper is drawn from a cassette through a recording zone between a linear electrode on the cassette and scanning styli electrodes which move on a belt along the linear electrode and cooperate therewith to mark graphic signals on the paper corresponding to electrical fascimile signals applied to the two electrodes.

It is the object of the present invention to provide an improved linear electrode for the cassette.

SUMMARY OF THE INVENTION

According to the invention a cassette for a facsimile recorder including a scanning electrode for marking a web drawn from the cassette comprises a housing for holding a supply of recording web, the housing forming a web exit path including a lip extending transversely of the web and adapted to oppose a scanning electrode external of the housing, and a cylindrical, linear recording electrode attached to and supported by the lip adjacent the web path for cooperation with the external scanning electrode.

DRAWINGS

FIG. 1 is a side elevation of a cassette recorder according to the invention, partly broken away;

FIG. 2 is an isometric view of a cassette according to the invention;

FIGS. 3 and 4 are enlarged details of the recording zone Z of FIG. 1; and

FIG. 5 is a bottom plan view of the cassette.

DESCRIPTION

The facsimile recorder of FIG. 1 comprises a housing with a base 1, sidewalls 2 of which one is shown, and a cover 3 hinged to the sidewalls at a point 4. Opening the cover affords access to a platform 6 which supports a recording paper cassette 8 which is the subject of the present invention. The cassette is secured on the platform 6 by clamps 9 pivotted to the sidewalls 2 at 11 as shown in U.S. Pat. No. 3,875,577. The cassette 8 encloses a supply roll 12 of moist electrolytic recording paper or like web whose leading end 13 is drawn out of the cassette by a feed roll 14 and an opposed idler roll 16. The shaft 17 of the feed roll 14 may be driven in any suitable way, as by a clock motor 18 shown in phantom. The recording paper 13 is drawn through a recording zone Z between a linear recording electrode 19 on the cassette 8 and scanning electrodes or styli 21. The styli are carried on a belt 22 as shown in FIGS. 1 and 3 and described in U.S. Pat. application Ser. No. 755,211. Other scanning electrodes such as rotating helical electrodes and stationary electrically commutated electrodes may be used in cooperation with the linear electrode 19 on the cassette 8. The stylus supporting belt 22 shown in FIGS. 1, 3 and 4 is orbitted by a wheel 23 driven on a shaft 24 by gears 26 and 27 linked to a motor M. As decribed further with respect to FIG. 4 the styli 21 scan along the recording zone Z so that electrical signals applied between the styli and linear electrode 19 mark graphic signals on the recording paper web between the electrodes by erosion of metal ions from the linear electrode 19 to lake formers of the electrolyte in the recording paper.

The cassette 8 which holds the recording paper roll 12 and its web end 13 comprises a generally tubular housing 31 of sheet plastic with an upper lip 32 and a lower lip 33 forming a web exit transversely of the cassette housing along the path of the web end 13 passing though the recording zone Z between the electrodes 19 and 21. The linear electrode 19 is thermally embedded in a conforming portion 34 of the thermoplastic lip 32 and is supported on the lip 32 by thermal bonding thereto. A major advantage of the present linear electrode is that it is extruded cylindrical rod or wire stainless steel stock having a uniform polygonal cross section. Preferably the polygonal stock is triangular or quadrangular with two of the polygonal faces forming a sharp linear recording ridge 20. Taking into account the limited supply of recording web in the cassette and the fact that the whole cassette will be discarded when the paper is exhausted the linear electrode need maintain its narrow recording ridge for a very limited life. During such an expected life the ridge 19 will vary from approximately 0.001 inch to 0.010 inch, an average of about 0.005 inch as compared with the constant 0.010 inch of a sheet metal linear electrode such as is used with other cassettes. The relative fineness of the recording ridge produces noticeably improved definition of the marking on the recording paper.

As shown in FIGS. 2, 4 and 5 the linear electrode 19 has integral extensions 19* cylindrically continuous with the rest of the electrode, these extensions 19* projecting laterally and externally of the cassette housing 8, particularly the lip 32. As shown particularly in FIG. 4 these extensions 19* are pressed and seated by the clamps 9 into an electrical connection with vee 36 formed in a spring 37 secured to the platform 6. The spring 37 is conductive and is conductively connected to the platform 6. A signal source 38 of marking signals applies the signals to the linear electrode through the spring 37 and to the scanning styli through the wheel 23. The polygonal electrode is thus particularly well adapted to embedment in the lip of the cassette and to conductive seating in the vee 36 of the spring 37.

Further advantages of the cylindrical linear electrode 19 are that its extruded or drawn wire like character eliminates additional working of the stock. It need simply be cut to length and bonded to the cassette lip 32. Such drawn stock is obviously less expensive than sheet stock which must be worked. Moreover most of the linear electrode is available for erosive recording except for that portion simply attached to the cassette lip 32 by thermal bonding.

It should be understood that the present disclosure is for the purpose of illustration only and that this invention includes all modifications and equivalents which fall within the scope of the appended claims.

I claim:

1. A cassette for a facsimile recorder including a scanning electrode for marking a web drawn from the cassette, the cassette comprising:

a housing for holding a supply of recording web, the housing forming a web exit path including a lip extending transversely of the web and adapted to oppose a scanning electrode external of the housing, and a cylindrical, linear recording electrode attached to and supported by the lip adjacent the web path for cooperation with the external scanning electrode.

2. A cassette according to claim 1 wherein the linear electrode has an integral extension laterally external of the housing.

3. A cassette according to claim 1 wherein the electrode is bar or wire stock.

4. A cassette according to claim 3 wherein the linear electrode is a wholly straight length of stock.

5. A cassette according to claim 1 wherein the cassette lip has an extension of sheet plastic along the exit path, the electrode being bonded to the sheet plastic.

6. A cassette according to claim 5 wherein the cassette material is thermoplastic and the electrode is thermally bonded by and to the cassette material.

7. A cassette according to claim 1 wherein the cylindrical cross section of the electrode is polygonal.

8. A cassette according to claim 7 wherein the electrode has a sharp linear recording ridge formed by two polygonal faces.

9. A cassette according to claim 7 wherein the cassette lip has an upward concavity conforming to the polygonal electrode cross section embedded therein.

* * * * *